(12) United States Patent
Bennett et al.

(10) Patent No.: US 7,636,770 B2
(45) Date of Patent: Dec. 22, 2009

(54) SYSTEM, METHOD AND COMPUTER PROGRAM PRODUCT FOR PUBLISHING INTERACTIVE WEB CONTENT AS A STATICALLY LINKED WEB HIERARCHY

(75) Inventors: Craig A. Bennett, Woodstock, GA (US); Michael J. Beranek, Marietta, GA (US); Jeffrey J. Bonasso, Pittsburgh, PA (US); Christopher J. Davia, Smyrna, GA (US); Steven W. Stapel, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/479,190

(22) Filed: Jun. 30, 2006

(65) Prior Publication Data

US 2006/0248453 A1 Nov. 2, 2006

Related U.S. Application Data

(62) Division of application No. 09/427,459, filed on Oct. 22, 1999, now Pat. No. 7,096,417.

(51) Int. Cl.
*G06F 13/00* (2006.01)
(52) U.S. Cl. .................. 709/219; 709/224; 709/225
(58) Field of Classification Search ............... 709/217, 709/219, 223, 224, 225
See application file for complete search history.

(56) References Cited

U.S. PATENT DOCUMENTS

| | | | |
|---|---|---|---|
| 5,551,030 A | 8/1996 | Linden et al. ............ 395/600 |
| 5,715,453 A | 2/1998 | Stewart .................... 395/615 |
| 5,745,360 A | 4/1998 | Leone et al. .............. 364/140 |
| 5,761,673 A | 6/1998 | Bookman et al. ........ 709/311 |
| 5,802,367 A | 9/1998 | Held et al. |
| 5,804,803 A | 9/1998 | Cragun et al. ............ 235/375 |
| 5,894,554 A | 4/1999 | Lowery et al. |
| 5,903,902 A | 5/1999 | Orr et al. .................. 707/517 |
| 5,933,606 A | 8/1999 | Mayhew ................... 709/239 |
| 5,963,208 A | 10/1999 | Dolan et al. .............. 715/760 |
| 5,968,125 A | 10/1999 | Garrick et al. |

(Continued)

FOREIGN PATENT DOCUMENTS

WO WO 99/08182 2/1999

OTHER PUBLICATIONS

Chen et al., A new approach to routing with dynamic metrics, IEEE 1999, pp. 661-670.

(Continued)

*Primary Examiner*—Viet Vu
(74) *Attorney, Agent, or Firm*—Schmeiser, Olsen & Watts; William E. Schiesser (57) ABSTRACT

With a client connected to a server, an agent tool simulates user interaction and traversal of dynamic web pages, causing the server-side processes to serve HTML pages to the client. As these pages are served, they are collected by the agent, modified to include static hyperlinks to replace the server side directed navigation logic, and then persistently stored in local files where they are available for off-line navigation by a browser without the need for accessing the server(s). In effect, the HTML pages are published.

16 Claims, 6 Drawing Sheets

U.S. PATENT DOCUMENTS

| | | | |
|---|---|---|---|
| 5,973,696 A | 10/1999 | Agranat et al. | 345/760 |
| 5,987,480 A | 11/1999 | Donohue et al. | 715/501.1 |
| 5,999,912 A | 12/1999 | Wodarz et al. | |
| 6,018,748 A | 1/2000 | Smith | 715/501.1 |
| 6,021,426 A | 2/2000 | Douglis et al. | 709/200 |
| 6,038,598 A | 3/2000 | Danneels | 709/219 |
| 6,101,510 A | 8/2000 | Stone et al. | 715/513 |
| 6,112,242 A | 8/2000 | Jois et al. | |
| 6,163,779 A * | 12/2000 | Mantha et al. | 707/100 |
| 6,182,122 B1 * | 1/2001 | Berstis | 709/217 |
| 6,259,958 B1 | 7/2001 | Steinman et al. | 700/97 |
| 6,408,360 B1 | 6/2002 | Chamberlain et al. | 711/124 |
| 6,411,999 B1 | 6/2002 | Tinkler | 709/224 |
| 6,462,754 B1 | 10/2002 | Chakraborty et al. | 345/723 |
| 6,466,970 B1 | 10/2002 | Lee et al. | 709/217 |
| 6,466,981 B1 | 10/2002 | Levy | |
| 6,493,758 B1 * | 12/2002 | McLain | 709/227 |
| 6,549,944 B1 | 4/2003 | Weinberg et al. | |
| 6,581,065 B1 | 6/2003 | Rodkin et al. | 707/102 |
| 6,584,498 B2 | 6/2003 | Nguyen | |
| 6,597,377 B1 | 7/2003 | MacPhail | 345/738 |
| 6,601,100 B2 | 7/2003 | Lee et al. | 709/226 |
| 6,647,535 B1 | 11/2003 | Bozdagi et al. | |
| 6,826,594 B1 | 11/2004 | Pettersen | |
| 6,832,222 B1 | 12/2004 | Zimowski | 707/9 |
| 6,839,757 B1 | 1/2005 | Romano et al. | |
| 7,096,417 B1 | 8/2006 | Bennett et al. | |
| 2002/0026563 A1 | 2/2002 | Chamberlain et al. | 711/138 |
| 2002/0049828 A1 | 4/2002 | Pekarek-Kostka | |
| 2002/0091725 A1 | 7/2002 | Skok | 707/501.1 |
| 2002/0198939 A1 | 12/2002 | Lee et al. | 702/203 |
| 2003/0018612 A1 | 1/2003 | Melbin | 707/1 |
| 2003/0140045 A1 | 7/2003 | Heninger et al. | 707/10 |
| 2004/0254913 A1 | 12/2004 | Berstein et al. | 707/2 |
| 2005/0021862 A1 | 1/2005 | Schroeder et al. | |
| 2005/0028195 A1 | 2/2005 | Feinleib et al. | |
| 2005/0060162 A1 | 3/2005 | Mohit et al. | |
| 2005/0081140 A1 | 4/2005 | Allen et al. | |

OTHER PUBLICATIONS

Manolescu et al., Link Management Framework for Hyper-media Documents, IEEE Jun. 1997, pp. 549-556.

Chen, Structuring and Visualsing the WWW by Generalised Similarity Analysis, ACM 1997, pp. 1-10.

Chanllenger et al., A Scalable and Highly Available System for Serving Dynamic Data at Frequently Accessed Web Sites, IEEE 1998, pp. 1-30.

Clarke, Sun Moves to Commercialize the Internet—Four-point Plan Includes Tools to Publish Applications and Guarantee Security, Electronic Engineering Times, Jun. 5, 1995, p. 22.

Kendall, Hypertextual Dynamics in a Life Set for Two, ACM 1996, pp. 74-83.

Dean, Drew. The Security of Static Typing with Dynamic Linking. ACM 0-89791-912-2/97/04, 1997, pp. 18-27.

Download Web Sites—Navigating Links. PC Magazine: PC Tech. [online]. 2 pages. Retrieved Jun. 1, 1999. Retrieved from the Internet:< URL: wysiwyg://3/http://www.zdnet.com/pcmag/pctech/content/17/04/ut1704.001.htm>.

Sipe, S. E. SiteSnagger: Download Web Sites. PC Magazine OnLine. [online]. 2 pages. Retrieved Jun. 1, 1999. Retrieved from the Internet:< URL: wysiwyg://1/http://www.zdnet.com/pcmag/pctech/content/17/04/ut1704.007.htm>.

Tucow's Offline Browsers. [online]. 8 pages. Retrieved Jun. 4, 1999. Retrieved from the Internet:< URL: http://hyperion.centrin.net.id/tucows/offlinent.htm>.

* cited by examiner

QUESTION: SELECT...

ANSWER A
ANSWER B
ANSWER C
ANSWER D

/ 74

RESPONSE:

☐ NONE
☐ A ONLY
☐ B ONLY
☐ C ONLY
☐ D ONLY
☐ A AND B
☐ A AND C
☐ A AND D
☐ B AND C
☐ B AND D
☐ C AND D
☐ A AND B AND C
☐ A AND B AND D
☐ A AND C AND D
☐ B AND C AND D
☐ A AND B AND C AND D

☐ DONE

FIG. 7

SYSTEM, METHOD AND COMPUTER PROGRAM PRODUCT FOR PUBLISHING INTERACTIVE WEB CONTENT AS A STATICALLY LINKED WEB HIERARCHY

This application is a divisional of and claims priority of U.S. patent application ser. No. 09/427,459 filed 22 Oct. 1999 U.S. Pat. No. 7,096,417 issued 22 Aug. 2006 by Craig A. Bennett, Michael J. Beranek, Jeffrey J. Bonasso, Christopher J. Davis, and Steven W. Stapel, for System, Method, and Computer Program Product for Publishing Interactive Web Content as a Statically Linked Web Hierarchy.

BACKGROUND OF THE INVENTION

1. Technical Field of the Invention

This invention pertains to Web technology. More particularly, it pertains to resolving and storing dynamic links as static links for publishing web content.

2. Background Art

Off-line Web browsers download web pages, and all associated graphics or the like, and save them on local media, such as a client hard drive, for viewing off-line. Many of these browsers provide the capability to the a user to specify a "depth" (maximum number of recursive links that are to be followed) and will follow links from the pages the user specifies. This is useful for users with limited time on-line, or who want to save a particularly good web page, graphics and all.

Available in the art are many such client web caching programs. These include, for example, GetBot, Robo Surfer, Web Buddy, WebCopy99, WebZip, and SurfExpress. In addition, many web servers have a server side cache function that operates in much the same manner as these client-side web caching programs.

However, none of these caching programs provide the ability to follow data driven dynamic links, those links that are derived by executing some logic on the server, possibly in conjunction with parameters passed from user interaction with a web page, and to modify the original page to contain all of the necessary information, including static links or Javascript, to access the pages that have been followed.

It is an object of the invention to provide a system and method for publishing dynamically linked, interactive content as a statically linked web hierarchy at a client side process.

It is a further object of the invention to provide a system and method for discovering the structure of a web site and convert any and all dynamically generated content into static pages.

It is a further object of the invention to provide a system and method for modifying function components in dynamically linked, interactive web page content to provide equivalent behaviors at a client without server side transaction processing.

It is a further object of the invention to provide a system and method for publishing highly interactive web content to a distributable media, thereby eliminating the need for a server or network connection.

It is a further object of the invention to provide a system and method for interacting with highly interactive web content when in a disconnected mode or in an area of the world where network infrastructure requires distribution on local media.

It is a further object of the invention to provide a system and method for publishing the content of HTML pages dynamically generated by a web server based on user interaction as if it was retrieved interactively and making the resulting content available via local media.

It is a further object of the invention to provide a system and method for accessing the content of HTML pages dynamically generated by a web server based on user interaction, without being connected to the server.

It is a further object of the invention to provide a system and method for publishing web content to a CDROM or other client based storage medium and for accessing that content through any non-connected computer browser.

It is a further object of the invention to provide a system and method for following dynamic links, those that rely on server side Java or Common Gateway Architecture (CGA) program logic.

It is a further object of the invention to provide a system and method with the ability to follow data driven dynamic links and modify the original page to contain all of the necessary information to access the followed pages.

It is a further object of the invention to provide a system and method which enables a client web caching program to follow data driven dynamic links, those links that are derived by executing some logic on the server in conjunction with some parameters passed from user interaction with a web page, and modify the original page to contain all of the necessary information, including static links, Javascript and the like, to access the followed pages.

It is a further object of the invention to provide a system and method for transforming a set of Hyper-text Markup Language (HTML) that requires server interaction to a set of HTML that does not require server interaction.

SUMMARY OF THE INVENTION

In accordance with the method and system of the invention, a Hypertext Markup Language (HTML) web page is parsed by an agent to identify dynamic links, those that require the server to generate a next set of HTML. These dynamic links are then replaced with computed static representations in one or more files in persistent storage where they are available to a browser.

In accordance with an aspect of the invention, there is provided a computer program product configured to be operable to replace dynamic HTML links with computed static representations.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
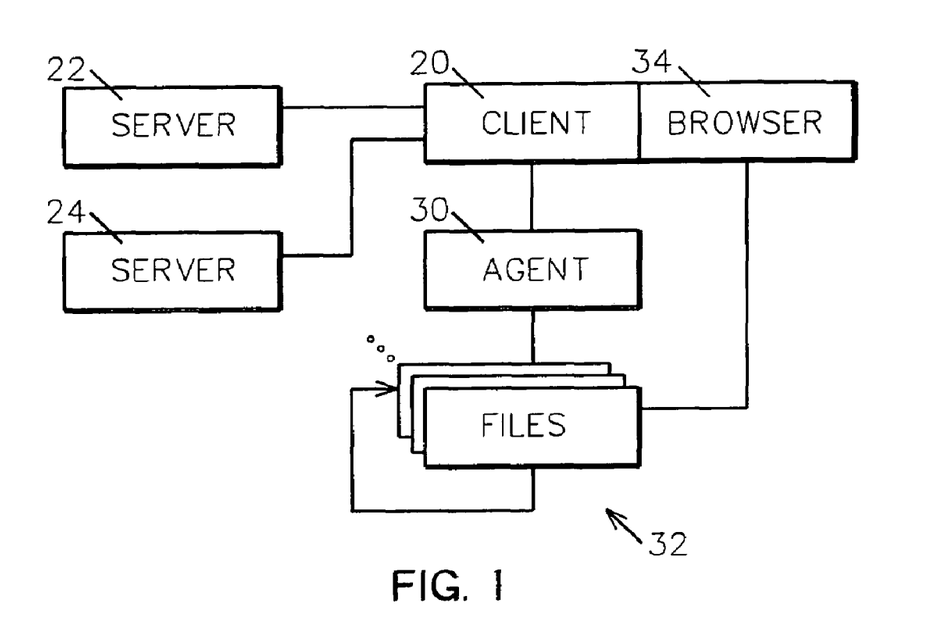
FIG. 1 is a high level system diagram of a server/client system including an agent in accordance with the preferred embodiment of the invention.

Referring to FIG. 1, the system of the preferred embodiment of the invention is shown. Client 20 is in communication with at least one server 22, or a plurality of servers including server 24. The method of the invention is implemented within agent 30, which resides as shown at client 20, but may also be server based (not shown). Agent 30 generates in a plurality of data and/or logic files 32 static representations of dynamic server based links. With client 20 disconnected from servers 22, 24, browser 34 accesses files 32 to simulate user interaction and traversal of dynamic web pages by following these static representations of the dynamic links.

In accordance with the preferred embodiment of the method of the invention, with client 20 connected to server 22, agent tool 30 simulates user interaction and traversal of dynamic web pages, causing the server-side processes 22, 24 to serve HTML pages to client 20. As these pages are served, they are collected by agent 30, modified to include static hyperlinks to replace the server side directed navigation logic, and then persistently stored in files 32 where they are available for off-line navigation by browser 34 without the need for servers 22, 24. In effect, the HTML pages are published.

Figures 2, 3:
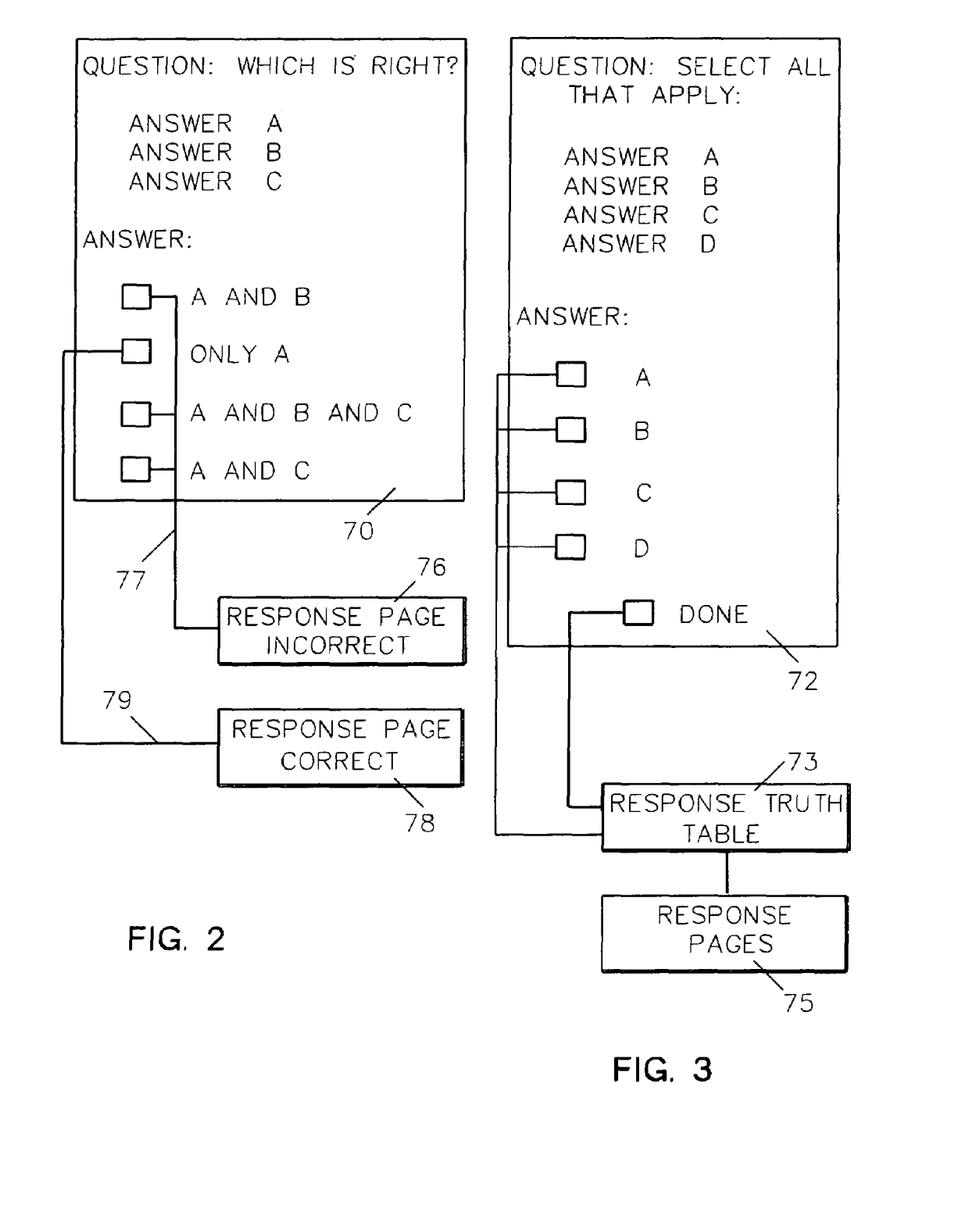
FIG. 2 is a diagrammatic representation of a web page illustrating one-to-one mapping of dynamic to static links.
FIG. 3 is a diagrammatic representation of a server generated web page illustrating selection combinations and of a corresponding agent generated web page which preserves the look and feel of the original server generated web page.

Referring to FIGS. 2 and 3, two (of many) types of web pages of interest to the invention are illustrated.

Referring to FIG. 2, the situation involving a one to one mapping of a dynamic link to a static link is illustrated. This web page asks a user to select among a plurality of possible answers, including A, B and C. As shown in this example, the response "ONLY A" is the only correct response, the others being incorrect. Consequently, response "ONLY A" is linked by link 79 to a page 78 for displaying a correct response to the user, and the others are linked by link 77 to a page 76 for an incorrect response. These links 77, 79 are dynamic links that are resolved at server 22. Agent 30 asks the server for the resolution and hard codes the corresponding links 77, 79 it receives as static links in the HTML stored in files 32. Thus, the server side derived link 77, 79 are replaced with corresponding hard coded links 77, 79 as server generated response pages 76, 78 are copied into local files 32. For example, server 22 knows that if the user checks option ONLY A, a dynamic link goes to correct response page 78 for display back to the user, and otherwise the dynamic link goes to wrong answer page 76. Agent 30 HTML sends a post to server 22 that it needs resolution of the link, and that link resolution is replaced by agent 30 in files 32 with a link to the right answer page in files 32.

Figure 4:
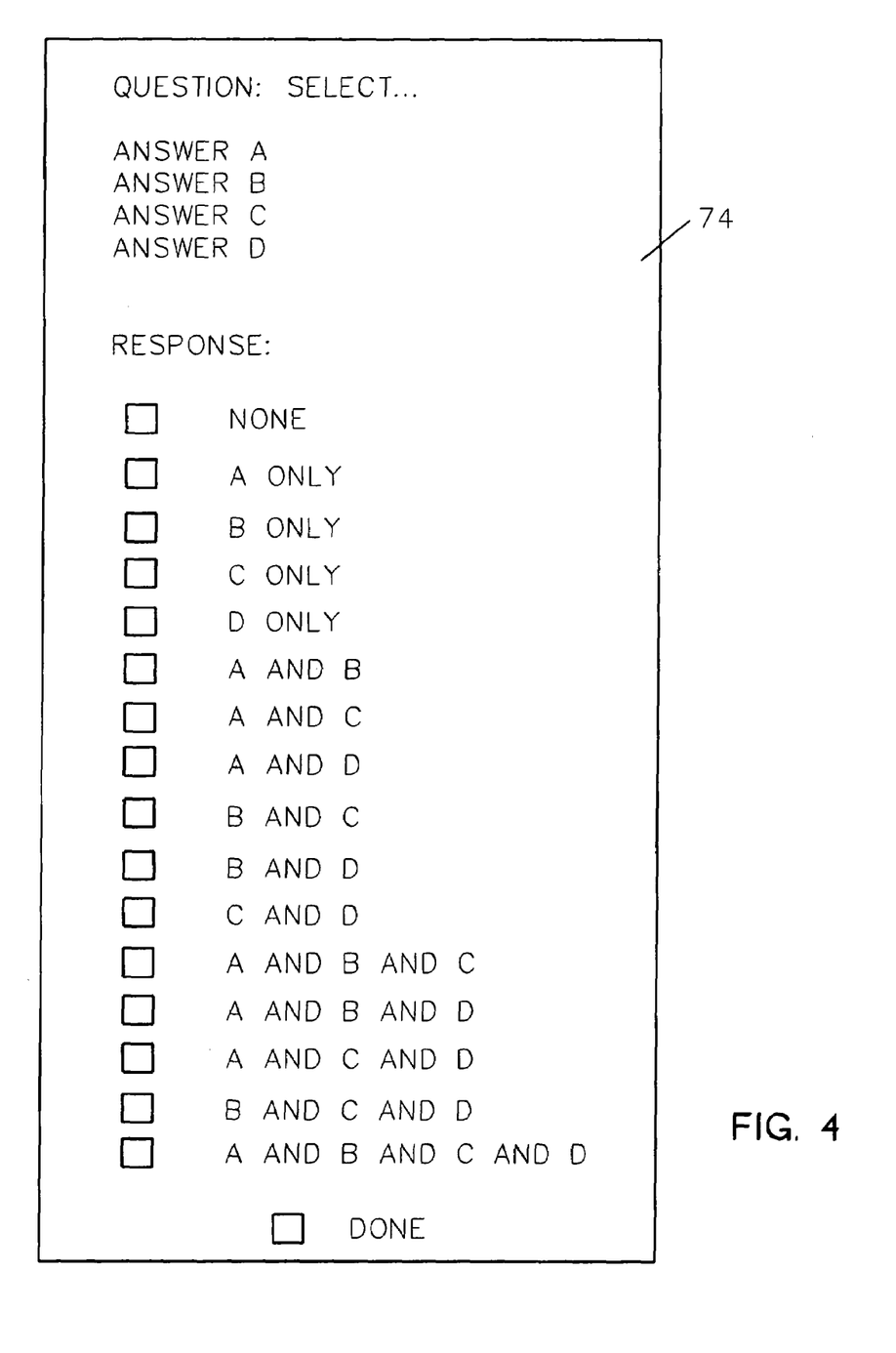
FIG. 4 is a diagrammatic representation of an agent generated web page based on the server generated web page of FIG. 3 with modified look and feel.

Referring to FIG. 3, a web page is illustrated for the case where there is a decision that needs to be made. The right answer is represented by a combination of selections. Any combination of null, A, B, C and D are possible responses, and any one or more combination of these possible responses may be correct response. Correct responses grow as 2 to the power of the number (N) of possible selections (and if null is not a possible response, that value $2^N-1$), and include only A, only B, only C, only D, A and B, A and C, A and D, B and C, B and D C and D, and so forth. (All possible $2^N$ responses, including null, are shown in FIG. 4.) FIG. 3 represents both a server based web page (one generated without reference to the agent of the invention), and a client based web page resulting from agent 30 processing which maintains the look and feel of the original, server based web page. Maintaining "look and feel" refers, in this case to keeping the ABCD responses as shown in FIG. 3, rather than replacing the server generated display of FIG. 3 with a display presenting all of the possible combinations that could be converted to static, as is done in FIG. 4.

By way of a first example, generating a client based web page such as is illustrated in FIG. 4, without maintaining the look and feel, is done by opening a url connection to server 22; getting back as a response a set of HTML (web pages); scanning these HTML for other references to that server 22; opening up a url connection for each reference to a server; getting back more responses—more HTML; recursively doing that for each reference until there are no more remaining; for each request back, writing out into a flat file 32 corresponding web pages with static links which maintain the structure of url references in the original HTML.

By way of a second example, generating a client based web page such as is illustrated in FIG. 3, without changing look and feel (that is, without changing the number of possible selections displayed), is done in much the same way as in the first example, except that as results are received from server 22, each potential input is simulated to derive all potential outcomes. These results may be collected in a truth table 73, represented or implemented as an array, or as a linked list, flat file, or hash table—such as in Javascript or some other client 20 object in, for example, main storage (not shown). These are linked in turn to response pages 75 in local files 32. (Java is described at http://www.javasoft.com, Javascript is described at http://devedge.netscape.com and CGI is described at http://www.cgi-perl.com.)

If, in example 1, a truth table is used to link answers to response pages, it is not required that the links be persistent in the HTML. Rather, as is illustrated in FIG. 4, permutations are assigned new display selection options that represent all the possible permutations. An example of such a truth table is set forth in Table 1.

TABLE 1

TRUTH TABLE

|   | A | B | C | D |
|---|---|---|---|---|
| A | 0 | 0 | 0 | 0 |
| B | 0 | 0 | 1 | 0 |
| C | 0 | 1 | 0 | 0 |
| D | 0 | 0 | 0 | 0 |

Above example truth table indicates that answers of C & B is correct, all others are incorrect. The client side javascript examines the answer the user provides and compares that answer to the valid values provided in the truth table and make a determination on the path to be followed. The truth table is built by agent 30 during processing and is inserted into the resulting client side, generated web content file 32.

Referring to FIG. 4, the look and feel of the web page is changed to list all possible responses. Alternatively, agent 30 may replace server 22 side logic with some client 20 side logic (such as an applet) to emulate what the server side does. Such an applet handles specific types of questions and server side logic, such as multiple choice, single response; multiple choice, multiple response; matching; grid; and so forth. Agent 30 provides parameters to the server imbedded in the generated web content to have the server provide the client side logic.

Figure 5:
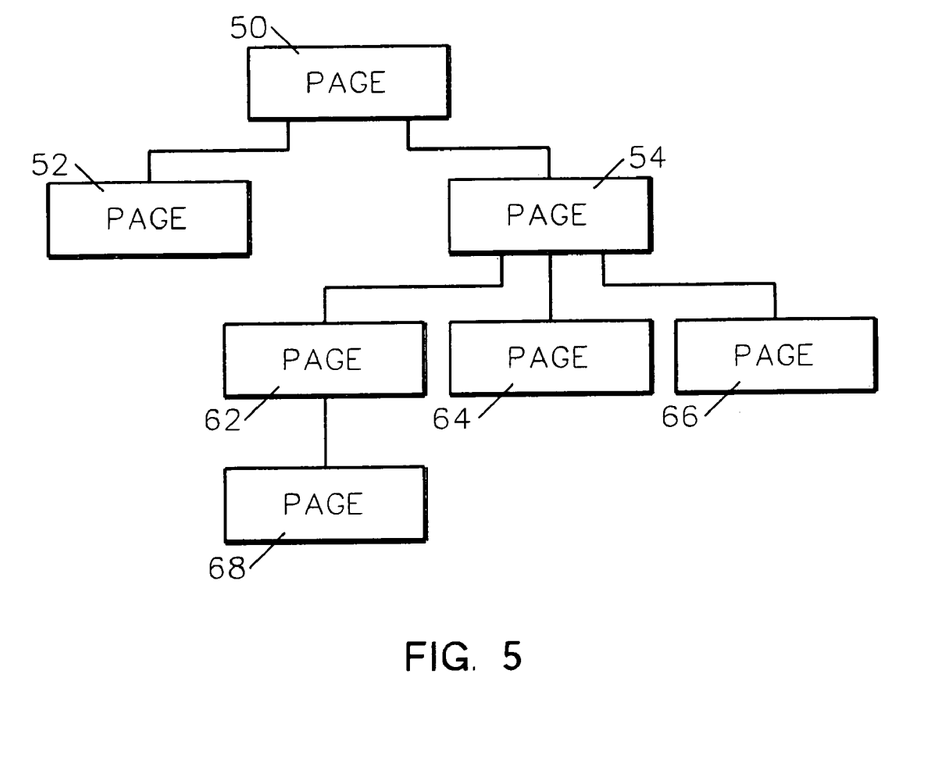
FIG. 5 is an illustration of a plurality of hierarchical, linked web pages.

Referring to FIG. 5, a hierarchy of web pages is illustrated. By way of example, page 50 is served by server 22, and contains links to pages 52 and 54, also served by server 22. Page 54, corresponding for example to page 70, contains links to pages 62, 64, and 66, with, for example, page 64 corresponding to response page 76 and page 66 corresponding to response page 78. Page 62 contains a link to page 68 which, in this example, is served by server 24. Pages 52 and 54 are at a depth of 1, pages 62, 64 and 66 are at a depth of 2, and page 68 is at a depth of 3 below the original, or parent page 50. As servers 22 and 24 serve these pages to client 20 in response to requests from agent 30, each page is put in a separate file 32, and the dynamic links to servers 22, 24 replaced with static links between corresponding pages in files 32.

In an alternative embodiment, page 54 may correspond to page 72, and pages 64 and 66 to response pages 75. Response truth table 73 is a location in main storage temporarily used for creating links from page 72 to response pages 75.

Figure 6:
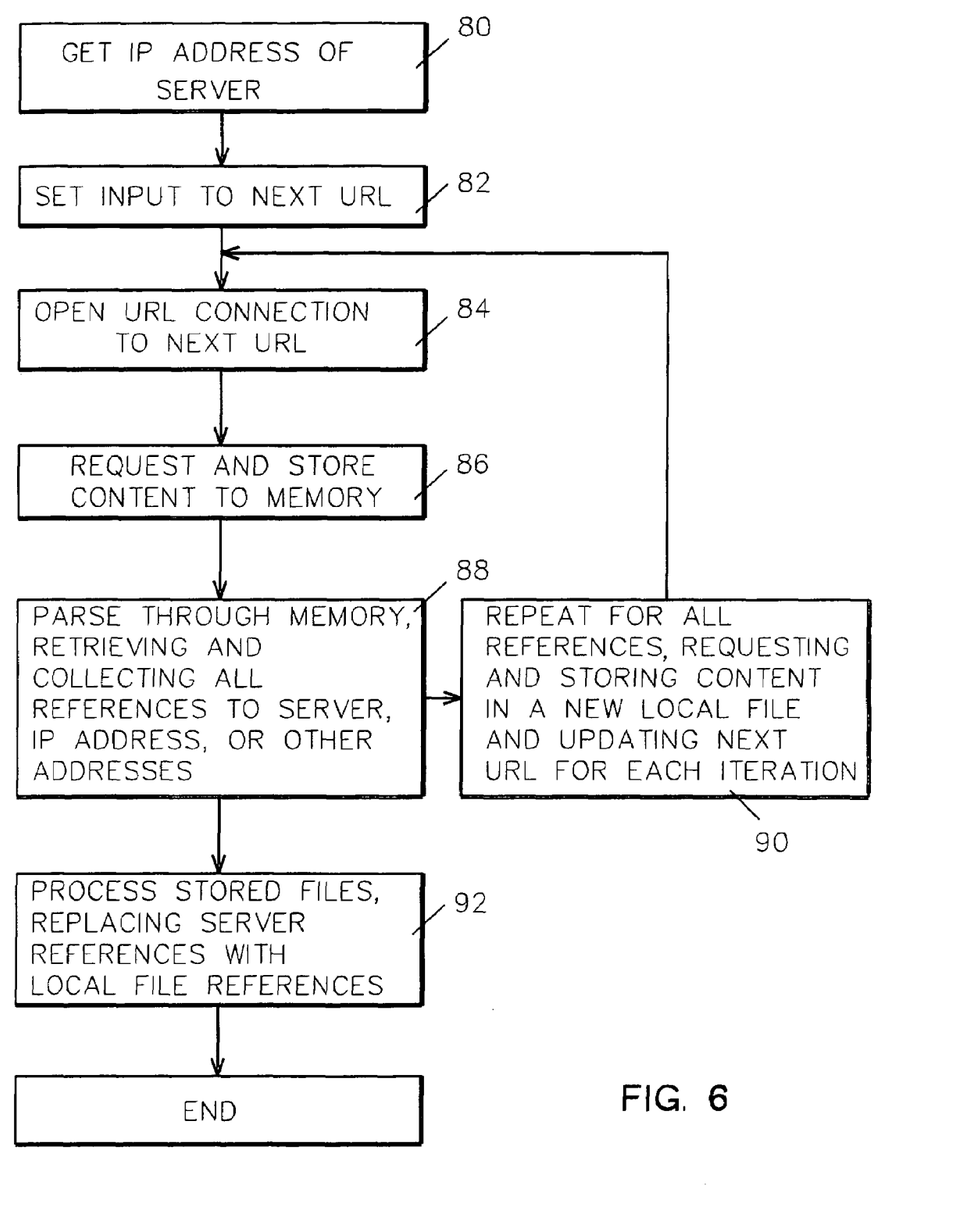
FIG. 6 is a flow diagram of the method of the invention for preserving server generated web page look and feel.

Referring to FIG. 6, a first embodiment of the method executed by agent 30 is set forth. Assume input from the user is to w3.ibm.com/hr/index.html, where server 22 is represented by w3.ibm.com, and its IP address is 9.243.100.100.

In step 80, client 20 gets the IP address 9.243.100.100 of server w3.ibm.com 22.

In step 82, next url variable is set to the entire address w3.ibm.com/hr/index.html.

In step 84, a url connection is opened to next url.

In step 86, agent 30 requests and stores the content of that url connection to memory.

In step 88, agent 30 parses through the contents of memory, retrieving and collecting all references to server 22 or IP addresses or other addresses of other servers 24.

In step 90, steps 84-88 are repeated through all references, with agent 30 requesting of servers 22, 24 and storing content served back in new local files 32, and updating next url for each iteration through steps 84-88.

In step 92, agent 30 processes the stored files 32, replacing server references (links to servers 22, 24) with local file references (links to other files within the collection of files 32).

The result is a set of local files 32 referencing each other, rather than the server(s) 22, 24.

Figure 7:
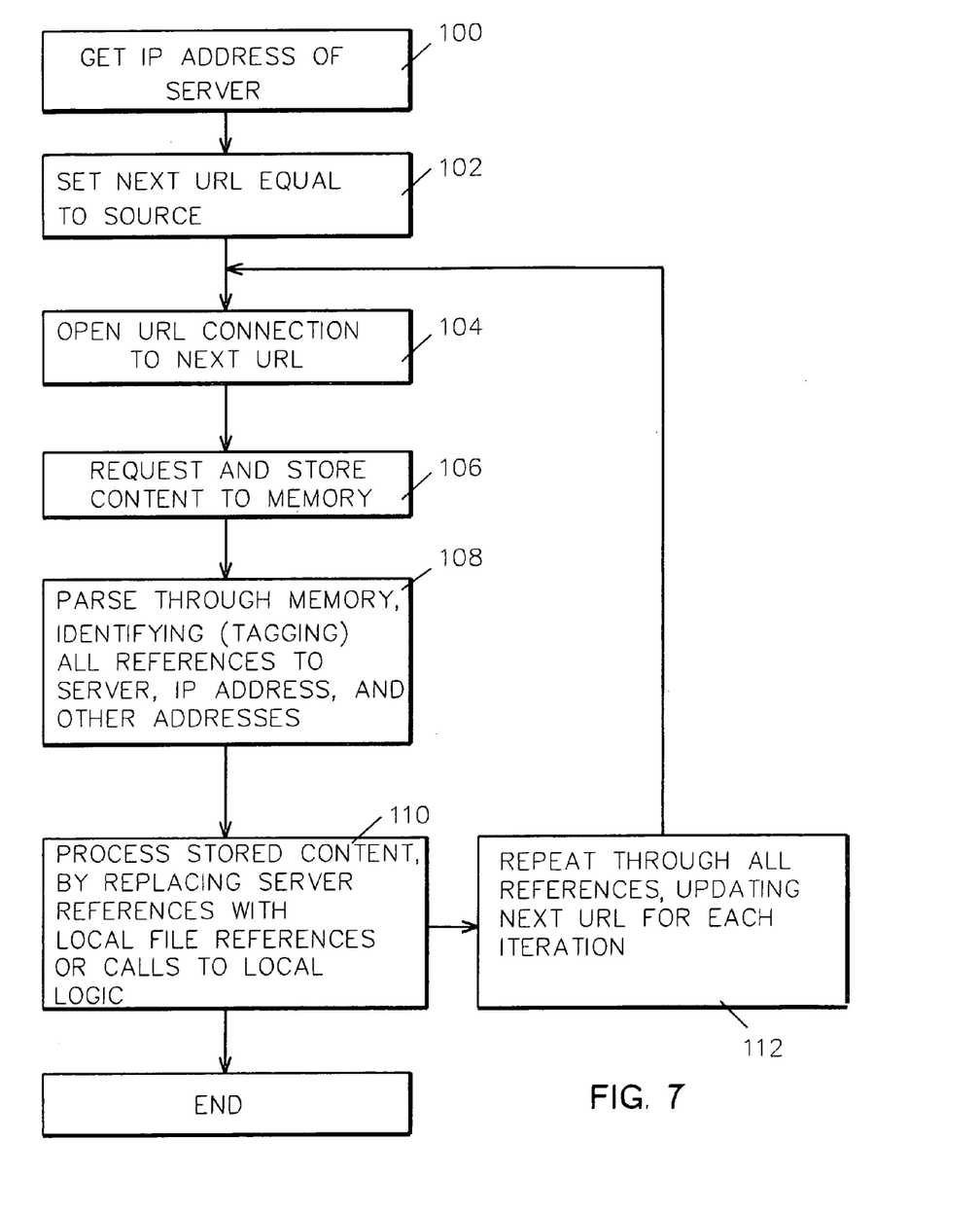
FIG. 7 is a flow diagram of the agent executed method of the invention, generic to maintaining or altering server generated web page look and feel.

Referring to FIG. 7, an alternative implementation of the method executed by agent 30 which allows either changing or preserving the look and feel of the web pages served to browser is illustrated.

In step 100, agent 30 gets the IP address of server 22.

In step 102, next url is set equal to source file w3.ibm.com/hr/index.html.

In step 104, a url connection is opened to next url.

In step 106, agent 30 requests and stores the content of that url to memory.

In step 108, agent 30 parses through the contents of memory, identifying (tagging) all references to server 22 (that is, url w3.ibm.com/hr/index.html or ip address 9.243.100.100, and addresses of other servers 24).

In step 110, agent 30 processes url content in stored files 32 by replacing server references with local file 32 references or calls to local logic.

In step 112, steps 104-110 are repeated for all references, updating next url for each iteration.

The create local logic step 110 requires that agent 30 keep a truth table 73 or equivalent representation of all the different combinations of answers A, B, C and D, and a link to the page to which they are resolved. This allows the look and feel to be preserved in the case where there are multiple inputs, as is illustrated in FIG. 3. Agent 30 need only understand where server 22 resolves the link, not the actual logic, provided the link is deterministic. (In a non-deterministic case, the result is a snapshot, so primary usefulness of the method of the invention is in deterministic cases; that is, in those cases where the servers are not rapidly changing their dynamic links.) An example of such deterministic usage is in a distance learning system, where correct responses are determined, and do not change as a function of time or some other such variable.

Advantages Over the Prior Art

It is an advantage of the invention that there is provided a system and method for publishing dynamically linked, interactive content as a statically linked web hierarchy at a client side process.

It is a further advantage of the invention that there is provided a system and method for discovering the structure of a web site and convert any and all dynamically generated content into static pages.

It is a further advantage of the invention that there is provided a system and method for modifying function components in dynamically linked, interactive web page content to provide equivalent behaviors at a client without server side transaction processing.

It is a further advantage of the invention that there is provided a system and method for publishing highly interactive web content to a distributable media, thereby eliminating the need for a server or network connection.

It is a further advantage of the invention that there is provided a system and method for interacting with highly interactive web content when in a disconnected mode or in an area of the world where network infrastructure requires distribution on local media.

It is a further advantage of the invention that there is provided a system and method for publishing the content of HTML pages dynamically generated by a web server based on user interaction as if those pages were retrieved interactively and making the resulting content available via local media.

It is a further advantage of the invention that there is provided a system and method for accessing the content of HTML pages dynamically generated by a web server based on user interaction, without being connected to the server.

It is a further advantage of the invention that there is provided a system and method for publishing web content to a CDROM or other client based storage medium and for accessing that content through any non-connected computer browser.

It is a further advantage of the invention that there is provided a system and method for following dynamic links, those that rely on server side Java or CGA program logic.

It is a further advantage of the invention that there is provided a system and method with the ability to follow data driven dynamic links and modify the original page to contain all of the necessary information to access the followed pages.

It is a further advantage of the invention that there is provided a system and method which enables a client web caching program to follow data driven dynamic links, those links that are derived by executing some logic on the server in conjunction with some parameters passed from user interaction with a web page, and modify the original page to contain all of the necessary information, including static links, Javascript and the like, to access the followed pages.

It is a further advantage of the invention that there is provided a system and method for transforming a set of Hypertext Markup Language (HTML) that requires server interaction to a set of HTML that does not require server interaction.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for accessing content dynamically generated by a server based on user interaction without being connected to said server, comprising the steps of:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

accessing each first depth dynamic navigation link in the top web page with respective data from the user input for said each first depth dynamic navigation link through a respective connection to a respective server associated with said each first depth dynamic navigation link;

collecting a respective first depth web page associated with said each first depth dynamic navigation link, said respective server generating said respective first depth web page responsive to the respective data provided in said accessing;

saving said respective first depth web page in at least one respective first depth local file associated with said each first depth dynamic navigation link; and processing the stored top web page, said processing comprising:

creating, in the client, a response truth table that maps all possible combinations of said respective data from the user input for said each first depth dynamic navigation link to a respective local reference result of each combination of said all possible combination, wherein a number of said respective data is N that is a positive integer greater than one (1), and wherein a number of said all possible combinations is not greater than $(2^N)$;

associating said respective reference result with said at least one respective first depth local file;

replacing, in the stored top web page, said each first depth dynamic navigation link with a respective local link referring to said at least one respective first depth local file such that all respective first depth dynamic navigation links in the stored top web page for each combination of said all possible combinations of said respective data locally refer to respective first depth local file according to the respective local reference result associated with said each combination in the response truth table.

2. Method for accessing content dynamically generated by a server based on user interaction without being connected to said server, comprising the steps of:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

identifying, in the top web page, each first depth dynamic navigation link to a respective server associated with said each first depth dynamic navigation link; and processing the stored top web page, said processing comprising:

creating, in the client, a collection of local files associated with each combination of all possible combinations of said respective data from the user input for said each first depth dynamic navigation link, wherein each local file of said collection is selected from the group consisting of a local data file that is equivalent to a respective result generated by said respective server using said each combination, a local executable file that simulates services of said respective server using said each combination in the client, wherein a number of said respective data is N that is a positive integer greater than one (1), and wherein a number of said all possible combinations is not greater than ($2^N$);

replacing, in the stored top web page, said each first depth dynamic navigation link from said identifying with a collection of local links associated with said collection of local files such that the stored top web page comprises the collection of local links associated with said each local file.

3. The method of claim 1, further comprising the step of publishing to a client based storage medium said at least one respective local file such that the client is configured to access the content accessed by said locator value without being connected to the server.

4. The method of claim 2, further comprising the step of publishing said stored content to a client based storage medium such that the client is configured to access the content accessed by said locator value without being connected to the server.

5. A computer program product comprising:
   a computer readable storage medium having a computer readable program code embodied therein, said computer readable program code containing instructions that perform a method comprising:
   receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;
   setting a locator value to correspond to the address of said server of the top web page, wherein said locator value is a dynamic navigation link that generates the top web page based on the user input;
   opening a connection from the client to said locator value, said opening comprising providing data from the user input to resolve the dynamic navigation link to generate the top web page;
   requesting to the server the top web page specified in said locator value through said connection, such that the server generates the top web page responsive to the data provided in said opening;
   retrieving the requested top web page from the server;
   storing in a memory device of the client, the retrieved top web page;
   parsing through the stored top web page, said parsing comprising:
   accessing each first depth dynamic navigation link in the top web page with respective data from the user input for said each first depth dynamic navigation link through a respective connection to a respective server associated with said each first depth dynamic navigation link;
   collecting a respective first depth web page associated with said each first depth dynamic navigation link, said respective server generating said respective first depth web page responsive to the respective data provided in said accessing;
   saving said respective first depth web page in at least one respective first depth local file associated with said each first depth dynamic navigation link; and
   processing the stored top web page, said processing comprising:
   creating, in the client, a response truth table that maps all possible combinations of said respective data from the user input for said each first depth dynamic navigation link to a respective local reference result of each combination of said all possible combination, wherein a number of said respective data is N that is a positive integer greater than one (1), and wherein a number of said all possible combinations is not greater than ($2^N$);
   associating said respective reference result with said at least one respective first depth local file;
   replacing, in the stored top web page, said each first depth dynamic navigation link with a respective local link referring to said at least one respective first depth local file such that all respective first depth dynamic navigation links in the stored top web page for each combination of said all possible combinations of said respective data locally refer to respective first depth local file according to the respective local reference result associated with said each combination in the response truth table.

6. The computer program product of claim 5, further comprising the step of publishing to a client based storage medium said at least one respective local file such that the client is configured to access the content accessed by said locator value without being connected to the server.

7. A computer program product comprising:
   a computer readable storage medium having a computer readable program code embodied therein, said computer readable program code containing instructions that perform a method comprising:
   receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;
   setting a locator value to correspond to the address of said server of the top web page, wherein said locator value is a dynamic navigation link that generates the top web page based on the user input;
   opening a connection from the client to said locator value, said opening comprising providing data from the user input to resolve the dynamic navigation link to generate the top web page;
   requesting to the server the top web page specified in said locator value through said connection, such that the server generates the top web page responsive to the data provided in said opening;
   retrieving the requested top web page from the server;
   storing in a memory device of the client, the retrieved top web page;
   parsing through the stored top web page, said parsing comprising:
   identifying, in the top web page, each first depth dynamic navigation link to a respective server associated with said each first depth dynamic navigation link; and
   processing the stored top web page, said processing comprising:
   creating, in the client, a collection of local files associated with each combination of all possible combinations of said respective data from the user input for said each first depth dynamic navigation link, wherein each local file of said collection is selected from the group consisting of a local data file that is equivalent to a respective result generated by said respective server using said each combination, a local executable file that simulates services of said respective server using said each combination in the client, wherein a number of said respective data is N that is a positive integer greater than one (1), and wherein a number of said all possible combinations is not greater than ($2^N$);

replacing, in the stored top web page, said each first depth dynamic navigation link from said identifying with a collection of local links associated with said collection of local files such that the stored top web page comprises the collection of local links associated with said each local file.

8. The computer program product of claim 7, further comprising the step of publishing said stored content to a client based storage medium such that the client is configured to access the content accessed by said locator value without being connected to the server.

9. A computer system comprising a processor and a computer readable memory unit coupled to the processor, said computer readable memory unit containing instructions that when executed by the processor implement a method for accessing content dynamically generated by a server based on user interaction without being connected to said server, the method comprising:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

accessing each first depth dynamic navigation link in the top web page with respective data from the user input for said each first depth dynamic navigation link through a respective connection to a respective server associated with said each first depth dynamic navigation link;

collecting a respective first depth web page associated with said each first depth dynamic navigation link, said respective server generating said respective first depth web page responsive to the respective data provided in said accessing;

saving said respective first depth web page in at least one respective first depth local file associated with said each first depth dynamic navigation link; and processing the stored top web page, said processing comprising:

creating, in the client, a response truth table that maps all possible combinations of said respective data from the user input for said each first depth dynamic navigation link to a respective local reference result of each combination of said all possible combination, wherein a number of said respective data is N that is a positive integer greater than one (1), and wherein a number of said all possible combinations is not greater than ($2^N$);

associating said respective reference result with said at least one respective first depth local file;

replacing, in the stored top web page, said each first depth dynamic navigation link with a respective local link referring to said at least one respective first depth local file such that all respective first depth dynamic navigation links in the stored top web page for each combination of said all possible combinations of said respective data locally refer to respective first depth local file according to the respective local reference result associated with said each combination in the response truth table.

10. The computer system of claim 9, further comprising the step of publishing to a client based storage medium said at least one respective local file such that the client is configured to access the content accessed by said locator value without being connected to the server.

11. A computer system comprising a processor and a computer readable memory unit coupled to the processor, said computer readable memory unit containing instructions that when executed by the processor implement a method for accessing content dynamically generated by a server based on user interaction without being connected to said server, the method comprising:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

identifying, in the top web page, each first depth dynamic navigation link to a respective server associated with said each first depth dynamic navigation link; and processing the stored top web page, said processing comprising:

creating, in the client, a collection of local files associated with each combination of all possible combinations of said respective data from the user input for said each first depth dynamic navigation link, wherein each local file of said collection is selected from the group consisting of a local data file that is equivalent to a respective result generated by said respective server using said each combination, a local executable file that simulates services of said respective server using said each combination in the client, wherein a number of said respective data is N that is a positive integer greater than one (1), and wherein a number of said all possible combinations is not greater than ($2^N$);

replacing, in the stored top web page, said each first depth dynamic navigation link from said identifying with a collection of local links associated with said collection of local files such that the stored top web page comprises the collection of local links associated with said each local file.

12. The computer system of claim 11, further comprising the step of publishing said stored content to a client based storage medium such that the client is configured to access the content accessed by said locator value without being connected to the server.

13. A process for supporting computer infrastructure, said process comprising providing at least one support service for at least one of creating, integrating, hosting, maintaining, and deploying computer-readable code in a computing system, wherein the code in combination with the computing system is capable of performing a method for accessing content dynamically generated by a server based on user interaction without being connected to said server, the method comprising:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

accessing each first depth dynamic navigation link in the top web page with respective data from the user input for said each first depth dynamic navigation link through a respective connection to a respective server associated with said each first depth dynamic navigation link;

collecting a respective first depth web page associated with said each first depth dynamic navigation link, said respective server generating said respective first depth web page responsive to the respective data provided in said accessing;

saving said respective first depth web page in at least one respective first depth local file associated with said each first depth dynamic navigation link; and processing the stored top web page, said processing comprising:

creating, in the client, a response truth table that maps all possible combinations of said respective data from the user input for said each first depth dynamic navigation link to a respective local reference result of each combination of said all possible combination, wherein a number of said respective data is N that is a positive integer greater than one (1), and wherein a number of said all possible combinations is not greater than ($2^N$);

associating said respective reference result with said at least one respective first depth local file;

replacing, in the stored top web page, said each first depth dynamic navigation link with a respective local link referring to said at least one respective first depth local file such that all respective first depth dynamic navigation links in the stored top web page for each combination of said all possible combinations of said respective data locally refer to respective first depth local file according to the respective local reference result associated with said each combination in the response truth table.

14. The process of claim 13, further comprising the step of publishing to a client based storage medium said at least one respective local file such that the client is configured to access the content accessed by said locator value without being connected to the server.

15. A process for supporting computer infrastructure, said process comprising providing at least one support service for at least one of creating, integrating, hosting, maintaining, and deploying computer-readable code in a computing system, wherein the code in combination with the computing system is capable of performing a method for accessing content dynamically generated by a server based on user interaction without being connected to said server, the method comprising:

receiving, from a user input to a client, an address of said server, wherein said server dynamically generates the content comprising at least one web page upon being requested by the client, and wherein the content comprising said at least one web page is organized in a hierarchy according to a number of links to follow to access each web page of said at least one web page from a top web page;

setting a locator value to correspond to the address of said server of the top web page, wherein said locator value is a dynamic navigation link that generates the top web page based on the user input;

opening a connection from the client to said locator value, said opening comprising providing data from the user input to resolve the dynamic navigation link to generate the top web page;

requesting to the server the top web page specified in said locator value through said connection, such that the server generates the top web page responsive to the data provided in said opening;

retrieving the requested top web page from the server;

storing in a memory device of the client, the retrieved top web page;

parsing through the stored top web page, said parsing comprising:

identifying, in the top web page, each first depth dynamic navigation link to a respective server associated with said each first depth dynamic navigation link; and processing the stored top web page, said processing comprising:

creating, in the client, a collection of local files associated with each combination of all possible combinations of said respective data from the user input for said each first depth dynamic navigation link, wherein each local file of said collection is selected from the group consisting of a local data file that is equivalent to a respective result generated by said respective server using said each combination, a local executable file that simulates services of said respective server using said each combination in the client, wherein a number of said respective data is N that is a positive integer greater than one (1), and wherein a number of said all possible combinations is not greater than ($2^N$); replacing, in the stored top web page, said each first depth dynamic navigation link from said identifying with a collection of local links associated with said collection of local files such that the stored top web page comprises the collection of local links associated with said each local file.

16. The process of claim 15, further comprising the step of publishing said stored content to a client based storage medium such that the client is configured to access the content accessed by said locator value without being connected to the server.

\* \* \* \* \*